United States Patent Office 3,281,495
Patented Oct. 25, 1966

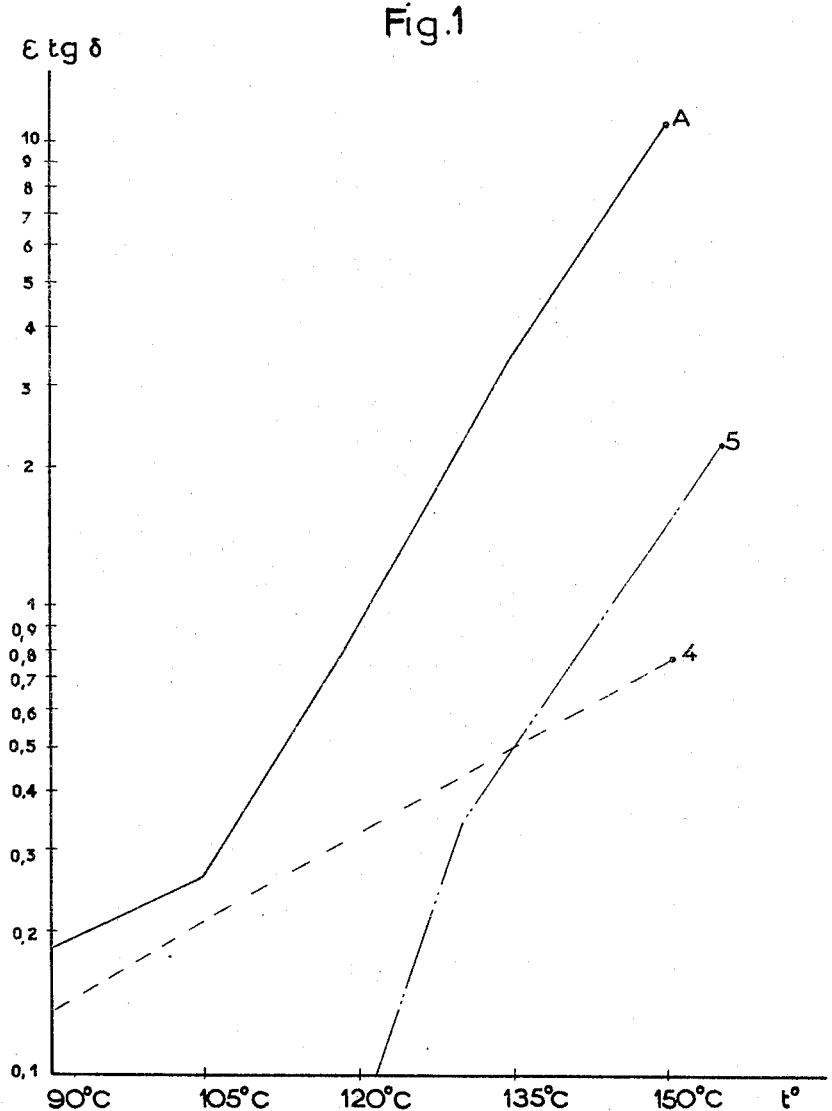

3,281,495
PROCESSES FOR HARDENING POLYEPOXIDES
Carl W. Heinen, Riehen, Switzerland, assignor to Societe Generale de Constructions Electriques et Mecaniques (Alsthom), Paris, France, a corporation of France
Filed Feb. 5, 1962, Ser. No. 170,980
Claims priority, application France, Feb. 15, 1961, 2,254, Patent 1,289,495; Feb. 15, 1961, 2,255, Patent 1,289,496
18 Claims. (Cl. 260—835)

The hardening of polyepoxides by polycarboxylic acids or acid polyesters obtained from aliphatic polyhydric alcohols and polycarboxylic acids is well known. It is thus possible to obtain hardened products endowed with good general properties, physical, electrical and also chemical, but having a poor resistance to thermal ageing.

It is an object of the present invention to provide a process for hardening polyepoxides by means of which the resistance of polyepoxides to thermal ageing can be improved even for temperatures above 155° C., and to obtain minimum variations in weight, size and mechanical properties, by using as hardeners acid polyesters or polyanhydrides of acid polyesters prepared from polyhydric phenols (instead of polyhydric aliphatic alcohols) and polycarboxylic acids.

It is a further object of the invention to provide resins which have been hardened by the use of the afore-mentioned acid polyesters or polyanhydrides of acid polyesters.

It is also an object of the invention to provide electrical insulation comprising a resin which has been hardened by the use of the afore-mentioned acid polyesters or polyanhydrides of acid polyesters.

In order to prepare the acid polyesters used according to the invention one may use in particular, polyhydric phenols having the following structures.

The polyhydric phenols used can have a single nucleus of the following type:

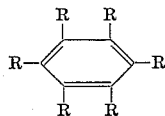

wherein at least two of the substituents designated by R are hydroxyl groups, and the others can be hydrogen, halogen, alkyl, aryl, cycloalkyl, alkylenyl radicals or combinations of these various elements. Good results have been obtained by using hydroquinone and resorcinol.

It is also possible to use polynuclear phenols having at least two phenolic groups of the following types:

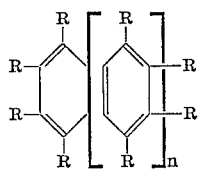

or

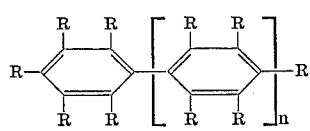

or

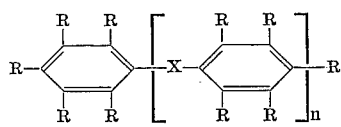

in which R can represent the same substituents as those previously mentioned and X can represent a bivalent group, such as:

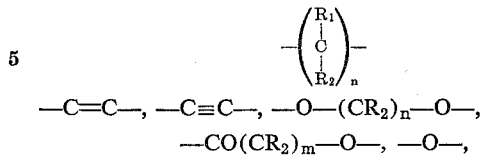

—S—, —SO$_2$—, —CO—, and —NR—, R, R$_1$ and R$_2$ always representing the same substituents as previously and $m$ and $n$ representing integers at least equal to 1.

The hydroxyl groups of these polyfunctional phenols can also be esterified, for example by acids having a low molecular weight.

Good results have been obtained by using the derivatives of p,p'-dihydroxydiphenylmethane and p,p'-dihydroxydiphenylpropane.

The polycarboxylic acids used for these phenols can have, for example, one of the following structures.

(1)

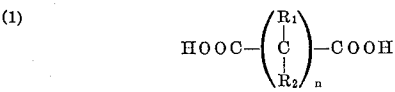

in which each of the substituents R$_1$ and R$_2$ is hydrogen, halogen, carboxyl, alkyl, aryl, cycloalkyl, alkylenyl, or their combinations, and $n$ is an integer at least equal to 1.

Good results have been obtained with adipic acid, succinic acid and sebacic acid.

(2)

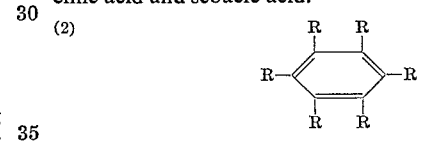

in which two at least of the substituents designated by R contain a carboxyl group, and the others can be one of the atoms or groups of atoms which have been just mentioned.

Good results have been obtained with phthalic acids.

(3)

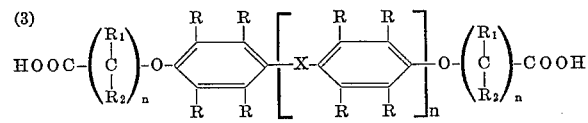

in which R, R$_1$ and R$_2$ designate one of the previously mentioned substituents, $n$ designates an integer at least equal to 1, and X represents a bivalent group such as:

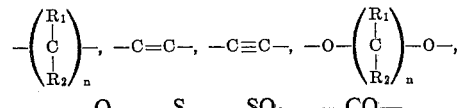

—O—, —S—, —SO$_2$—, —CO—

(4)

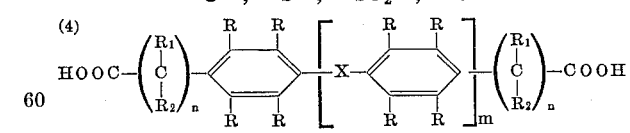

in which R and X have the same significance as that indicated in respect of the preceding example, $m$ represents an integer, and $n$ represents an integer ranging from 0 to 20.

Instead of the polycarboxylic acids, it is also possible to use their derivatives, for instance their anhydrides or their halides.

The preparation of these acid polyesters can be carried out in the usual manner: for example by direct esterification of the acids with phenols in the molten stage or in solution, with or without esterification catalysts. It is also possible to use, instead of the acids themselves, their derivatives such as the anhydrides or the halides. It is advantageous, in order to esterify the polycarboxylic acids, to use the esters of polyhydric phenols with acids having a low molecular weight. A transesterification then takes place which can be accelerated by a catalyst ad hoc, and the released acid is eliminated by distillation in the course of the reaction. In order to obtain acid polyesters, that is to say containing free carboxyl groups, it is preferable to use an excess of the polycarboxylic acid or of its derivatives, for the esterification.

In order to prepare polyanhydrides from corresponding polyesters, a dehydrating agent is used which may be either an anhydride of an organic or mineral acid, or a halide of the same acids, on the condition that it has no halogenising power.

The transanhydrisation of the acid polyesters by means of acetic anhydride has, in particular, given excellent results. It is, for example, possible to dissolve the acid polyester in an excess of an acetic acid derivative and to maintain the solution at a reflux temperature for several hours; the mixture is subsequently rid of the excess acetic acid derivative and the free acetic acid by distillation at normal pressure. The last traces of these substances can be eliminated by distillation under vacuum.

By means of the acid polyesters or the polyanhydrides of acid polyesters prepared in this manner, it is possible to harden polyepoxides such as, for example, the well-known synthetic resins called ethoxylinic resins. These may have a polyhydric alcohol base, for example glycerine, butanediol, or tetramethylolcyclohexanol, or may be polyhydric phenols, for example, p, p'-dihydroxydiphenylpropane (which is, in the subsequent description, designated more simply by DIAN), or their oxethylation products obtained by reaction with an epihalohydrin.

It has been found that it is possible to obtain particularly good mechanical properties and resistance to ageing by using for one epoxy equivalent of ethoxylinic resin from 0.1 to 1 acid equivalent of acid polyester or of the polyanhydride of acid polyester.

Hardening is generally effected at a temperature ranging between 20° C. and 250° C., preferably between 120° C. and 170° C. Usually one heats until the hardening is complete, which my be recognised from the insolubility of the hardened product in methylisobutylketone. Heating generally takes place for a period less than 48 hours, preferably less than 24 hours. The lower the temperature used, the longer the heating process lasts.

In the case of the hardening needing to be exceptionally rapid, it is convenient to work in the presence of an accelerator more particularly an amine. The quantities of accelerator to be used may be very small, preferably below 1% by weight of the mixture.

The products hardened according to the invention may also contain, if desired, apart from the hardeners, various other substances; for example: fillers, pigments, colouring materials, plasticisers and other resins or materials serving to form resins.

Non-limiting examples will now be given of the manner in which acid polyesters or polyanhydrides of acid polyesters may be prepared and used according to the invention for the hardening of polyepoxides.

EXAMPLE 1

A mixture of 55.0 g. of DIAN-O, O-diacetic acid, 37.4 g. DIAN diacetate and 9 g. of magnesium shavings is heated, with stirring, for three hours at from 220° C. to 230° C., the acetic acid distilling during the reaction. The formula of DIAN-O, O-diacetic acid is:

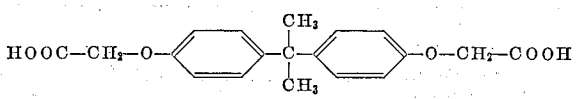

The formula of DIAN diacetate is

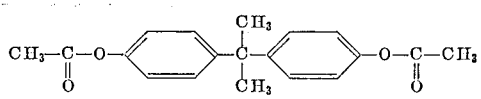

The resin thus obtained is dissolved in xylene and separated from the catalyst by filtration. The xylene is eliminated by distillation under vacuum. The acid polyester remains in the form of a solid dark brown resin having an acidity index of 57.

A mixture is made of 100 parts by weight of an epoxy resin having a base of DIAN and of epichlorhydrin, having an epoxy equivalent of 964, and 30 parts by weight of the above acid polyester; after careful mixing the mass is hardened in a suitable metallic mould for 8 hours at 150° C.

EXAMPLE 2

A mixture of 321 g. of tetrachloro-DIAN-O, O-diacetic acid and 150 g. of tetrachloro-DIAN diacetate is heated for five hours at 240° C., the acetic acid distilling during the reaction. The acid polyester formed is a solid brown resin having an acidity index of 130.

A mixture of 100 parts by weight of the same resin as in Example 1 and 50 parts by weight of this acid polyester is hardened for 8 hours at 150° C. as described in Example 1.

EXAMPLE 3

A mixture of 225 g. of tetrachloro-DIAN diacetate, 118 g. of succinic acid and 3.5 g. of magnesium shavings is heated for 3 hours at 240° C.; the acetic acid distilling during the reaction. The resin obtained is dissolved in xylene and the catalyst is removed by filtration, then the xylene is distilled off under vacuum. The acid polyester remains in the form of a solid brown resin having an acidity index of 118.

A mixture of 100 parts by weight of the same epoxy resin as in Example 1 and 20 parts by weight of this acid polyester is hardened as described in Example 1, for 10 hours at 150° C.

EXAMPLE 4

936 g. of DIAN diacetate and 809 g. of sebacic acid are heated for 3 hours at 220° C.; the acetic acid distilling during reaction. The acid polyester remains in the form of a brown viscous resin having an acidity index of 82.

A mixture of 100 parts by weight of the same epoxy resin as in Example 1 and 15 to 20 parts by weight of this acid polyester is hardened, as described in Example 1, for 10 hours at 165° C.

EXAMPLE 5

A mixture of 312 g. of DIAN diacetate and 292 g. of adipic acid is heated for 3 hours at 220° C.; the acetic acid distilling during reaction. The acid polyester remains in the form of a brown viscous resin having an acidity index of 109.

A mixture of 100 parts by weight of the same epoxy resin as in Example 1 and 50 parts by weight of this acid polyester is hardened, as shown in Example 1, for 10 hours at 165° C.

EXAMPLE 6

A mixture of 37.6 g. of DIAN diacetate and 32.4 g. of sebacic acid (molar ratio ¾) is maintained at 220°–230° C. for 5 hours; the acetic acid distilling during the reaction. The residue is dissolved in 5 parts by weight of acetic anhydride and is refluxed for 2 hours. After distillation of the acetic acid and of the excess of acetic anhydride the polyanhydride obtained has a saponification index of 350. The softening point of the resin is in the vicinity of 40° C.; in solution at 10% in benzene, its viscosity is 3.2 cp. at 20° C.; 20 parts of epoxy resin (epoxy equivalent=900) mixed with 4 parts by weight of this polyanhydride harden in 8 hours at 150° C.

The mechanical qualities of the products obtained by the hardening of polyepoxides by means of acid polyesters or polyanhydrides of acid polyesters according to the invention have been measured with the Dynstat apparatus according to the German national standards DIN 53 453 (shock resistance test) and 53 452 (bending test). The Dynastat apparatus is in current European use. The test results for shock and flexion resistance in Table II are measured in units which are in common use with this apparatus, but regardless of the units, the numerical values obtained are useful for purposes of comparison. Using a different type of apparatus and applying a different standard, different numerical values may be obtained, but the comparative order in which the test samples may be ranged should remain substantially the same.

The ageing tests were carried out in a ventilated furnace at 175° C. The loss of weight during the thermal ageing was determined with an analytical balance for 3 test pieces of 70 x 60 x 4 mm. for each product. The shrinkage (dimensional loss) as a result of the thermal ageing was determined on 3 test pieces of 70 x 60 x 4 mm. for each product, by means of a micrometer screw.

For comparison, an acid polyester was prepared with 3 mols of adipic acid and 1 mol of glycerine (acidity index 344). A mixture of 100 parts by weight of an epoxy resin prepared from DIAN and epichlorhydrin, having an epoxy index of 964, and 15 parts by weight of this polyester was hardened for 10 hours at 150° C.

The Tables I and II below give the results of comparative tests for thermal ageing at 175° C. for the comparison product which has just been defined and which is designated by A and for the products prepared according to Example 1–6, which are each designated by the number of the corresponding example.

Table I

| Weeks | Loss of weight | | | | Loss of length | | | |
|---|---|---|---|---|---|---|---|---|
| | 3 | 7 | 15 | 25 | 3 | 7 | 15 | 25 |
| Products: | | | | | | | | |
| A | 0.8 | 2.1 | 4.1 | 5.8 | 1.2 | 1.3 | 1.6 | 2.3 |
| 1 | 0.2 | 0.5 | 1.3 | 1.4 | 0.1 | 0.1 | 0.2 | 0.3 |
| 2 | 0.8 | 1.0 | 1.0 | 1.6 | 0.8 | 0.9 | 1.1 | 1.2 |
| 3 | 0.3 | 0.9 | 2.5 | 2.9 | 0.2 | 0.5 | 0.6 | 0.7 |
| 4 | 0.2 | 1.2 | 2.2 | 2.7 | 0.1 | 0.2 | 0.2 | 1.2 |
| 5 | 0.4 | 1.1 | 2.6 | 2.8 | 0.1 | 0.3 | 0.5 | 0.5 |
| 6 | 0.2 | 0.8 | 1.4 | 1.9 | 0.3 | 0.6 | 0.8 | 0.9 |

Table II

| Weeks | Shock Resistance kg. cm./cm.² | | | | | Flexion Resistance kg. cm./cm.² | | | | |
|---|---|---|---|---|---|---|---|---|---|---|
| | 0 | 3 | 7 | 15 | 25 | 0 | 3 | 7 | 15 | 25 |
| Products: | | | | | | | | | | |
| A | 50 | 42 | 15 | 10 | 6 | 1,320 | 1,310 | 1,230 | 1,180 | 890 |
| 1 | 26 | 24 | 18 | 13 | 13 | 1,210 | 1,160 | 1,130 | 1,090 | 1,090 |
| 2 | 36 | 28 | 26 | 21 | 19 | 1,290 | 1,220 | 1,180 | 1,180 | 1,170 |
| 3 | 42 | 28 | 28 | 25 | 22 | 1,270 | 1,210 | 1,210 | 1,190 | 1,180 |
| 4 | 27 | 26 | 25 | 25 | 23 | 1,380 | 1,360 | 1,230 | 1,230 | 1,200 |
| 5 | 25 | 18 | 17 | 16 | 16 | 1,430 | 1,340 | 1,310 | 1,290 | 1,270 |
| 6 | 50 | 41 | 17 | 12 | 7 | 1,390 | 1,370 | 1,340 | 1,320 | 1,300 |

The dielectric properties of materials obtained according to the invention are distinctly more advantageous than those of known analogous products, particularly at high temperatures. Thus it is possible to compare in Table III below the tangent of the angle of loss: tg $\delta$ and the dielectric constant $\epsilon$ of the products previously designated by A and of the products prepared according to Examples 4 and 5 and designated by the number of the example.

Table III

| | Product A | Product 4 | Product 5 |
|---|---|---|---|
| tg $\delta$ at 130° | 0.50 | 0.10 | 0.08 |
| tg $\delta$ at 150° | >1 | 0.20 | 0.50 |
| $\epsilon$ at 130° | 5.3 | 4.3 | 4.5 |
| $\epsilon$ at 150° | 7 | 4.3 | 4.5 |

In the accompanying graph the variation of the factor of dielectric losses $\epsilon$ tg $\delta$ has been shown as a function of the temperature for these three products (logarithmic scale). It is clear that product 5 has losses equal to those of product A for temperatures above 20° C. In the same manner product 4 has losses which are five times lower at 150°. These values clearly show the advantage obtained over dielectric properties of resins not utilising products obtained according to the invention.

The products prepared according to the invention can be used in many different fields, in particular those in which resins are to be moulded, cast and impregnated. These products also are very suitable for the impregnation of insulators for electrical conductors since they have, as well as excellent mechanical properties, low dielectric losses, thereby making their use particularly interesting.

It is possible, for example, to impregnate an inorganic material, for instance a micaceous tape, with a liquid mixture of an epoxide resin and of one of the hardeners of this invention, then to arrange this impregnated material around an electric conductor and finally to polymerise the resin.

A non-limiting example of how the insulation of an alternator segment can be carried out by means of an epoxide resin hardener according to the present invention, will now be described.

A tape constituted by a support of glass fabric and of mica paper or of a layer of mica flakes is prepared and this ribbon is impregnated by means of an acid polyester bisphenol sebacate solution and of a commercial epoxy resin having an epoxy equivalent of 870 to 1025. The relative proportions by weight of these constituents can vary from one part of acid polyester for 2 to 10 parts of epoxy resin.

The ribbon thus prepared may be placed on a composite alternator segment; then the insulated segment is dried under vacuum for a period ranging from 5 to 24 hours at a temperature between 50° C. and 140° C. so as to eliminate the solvents and the moisture. The bar can be moulded by any known process then the resin is entirely polymerised under pressure, for example in a bath of heated asphalt or by any other known means for heating under pressure.

The insulating system thus constituted has low dielectric losses up to 155° (loss factor below 1) and a strength characterised by a high resilience; these characteristics remain stable after several thousand hours at 155° C.

I claim:
1. In a process for hardening polyepoxides, the step of treating said polyepoxides with a compound selected from the group consisting of acid polyesters and polyanhydrides of acid polyesters, said acid polyesters being prepared by the reaction of a polyhydric compound selected from the group consisting of polyhydric phenols and esters of polyhydric phenols with an excess of a compound selected from the group consisting of polycarboxylic acids, anhydrides of polycarboxylic acids, and acid halides of polycarboxylic acids whereby substantially all phenolic hydroxy groups are esterified, said polyhydric compound being the sole hydroxyl containing reactants.

2. A process according to claim 1, wherein said polyhydric phenols are of the formula

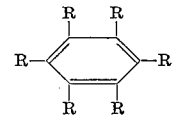

at least two of the substituents R being hydroxyl groups and each of the remaining substituents R being selected from the group consisting of hydrogen, halogen, alkyl, aryl, cycloalkyl and alkylenyl radicals.

3. A process according to claim 1, wherein said polyhydric phenol is hydroquinone.

4. A process according to claim 1, wherein said polyhydric phenol is resorcinol.

5. A process according to claim 1, wherein said polyhydric phenols are of the formula

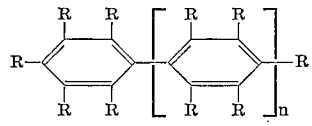

at least two of the substituents R being hydroxyl groups and each of the remaining substituents R being selected from the group consisting of hydrogen, halogen, alkyl, aryl, cycloalkyl and alkylenyl radicals, and $n$ representing an integer at least equal to 1.

6. A process according to claim 1, wherein said polyvalent phenols are of the formula

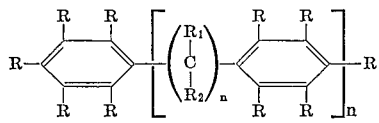

at least two of the substituents R being hydroxyl groups and each of the remaining substituents R being selected from the group consisting of hydrogen, halogen, alkyl, aryl, cycloalkyl and alkylenyl radicals, $n$ representing an integer at least equal to 1, an the substituents $R_1$ and $R_2$ being selected from the group consisting of hydroxyl, hydrogen, halogen, alkyl, aryl, cycloalkyl and alkylenyl radicals.

7. A process according to claim 1, wherein said polyvalent phenol is p,p'-dihydroxydiphenylmethane.

8. A process according to claim 1, wherein said polyvalent phenol is p,p'-dihydroxydiphenylpropane.

9. A process according to claim 1, wherein said polycarboxylic acids are of the formula

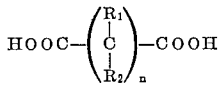

each of the substituents $R_1$ and $R_2$ being selected from the group consisting of hydrogen, halogen, carboxyl, alkyl, aryl, cycloalkyl and alkylenyl, and $n$ representing an integer at least equal to 1.

10. A process according to claim 1, wherein said polycarboxylic acids are selected from the group consisting of adipic, succinic and sebacic acids.

11. A process according to claim 1, wherein said polycarboxylic acids are of the formula

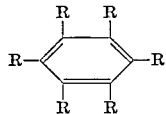

at least two of the substituents R containing a carboxyl group and each of the remaining substituents being selected from the group consisting of hydrogen, halogen, carboxyl, alkyl, aryl, cycloalkyl and alkylenyl.

12. A process according to claim 1, wherein said polycarboxylic acids are phthalic acids.

13. A process according to claim 1, wherein said polycarboxylic acids are of the formula

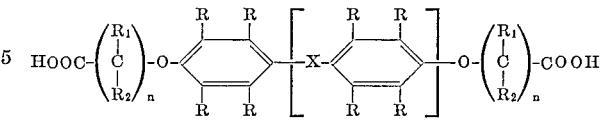

each of the substituents R, $R_1$ and $R_2$ being selected from the group consisting of hydrogen, halogen, carboxyl, alkyl, aryl, cycloalkyl and alkylenyl, $n$ representing an integer at least equal to 1, and X representing a bivalent group such as

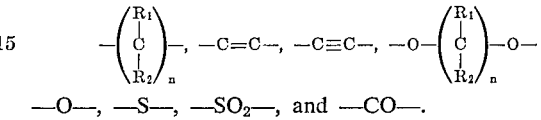

—O—, —S—, —SO$_2$—, and —CO—.

14. A process according to claim 1, wherein said polycarboxylic acids are of the formula

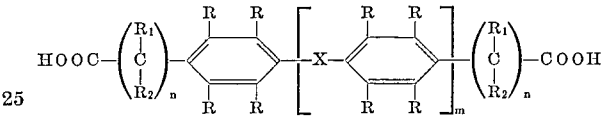

each of the substituents R, $R_1$ and $R_2$, being selected from the group consisting of hydrogen, halogen, carboxyl, alkyl, aryl, cycloalkyl and alkylenyl, $m$ representing an integer and $n$ representing an integer ranging from 0 to 20, and X representing a bivalent group such as

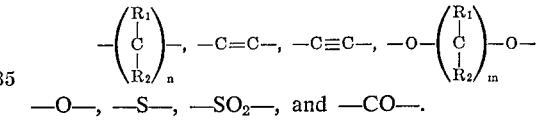

—O—, —S—, —SO$_2$—, and —CO—.

15. A resin hardened by a process according to claim 1.

16. Articles made from a resin according to claim 15.

17. Electrical insulation comprising a resin according to claim 15.

18. In a process for hardening polyepoxide resins, the steps of adding to one epoxy equivalent of resin from 0.1 to 1 acid equivalent of a compound selected from the group consisting of acid polyesters and polyanhydrides of acid polyesters, said acid polyesters being prepared by the reaction of a polyhydric compound selected from the group consisting of polyhydric phenols and esters of polyhydric phenols with an excess of a compound selected from the group consisting of polycarboxylic acids, anhydrides of polycarboxylic acids, and acid halides of polycarboxylic acids whereby substantially all phenolic hydroxy groups are esterified, said polyhydric compound being the sole hydroxyl containing reactants, and heating at a temperature of from 20° C. to 250° C. until the hardening is complete.

References Cited by the Examiner

UNITED STATES PATENTS

| | | | |
|---|---|---|---|
| 2,935,488 | 5/1952 | Phillips et al. | 260—45.4 |
| 3,027,279 | 3/1962 | Kurka et al. | 260—75 |
| 3,028,364 | 4/1962 | Conix et al. | 260—47 |
| 3,032,527 | 5/1962 | Greenlee | 260—47 |
| 3,043,799 | 7/1962 | Thiebaut et al. | 260—75 |
| 3,046,851 | 7/1962 | Vries | 260—45.4 |

SAMUEL H. BLECH, *Primary Examiner.*

LEON J. BERCOVITZ, *Examiner.*

E. J. TRONJNAR, *Assistant Examiner.*